(12) United States Patent
Suzuki et al.

(10) Patent No.: US 8,202,944 B2
(45) Date of Patent: *Jun. 19, 2012

(54) MODIFIED POLYMER, RUBBER COMPOSITION, AND TIRE

(75) Inventors: Eiju Suzuki, Tokyo (JP); Tetsuya Omura, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/722,892

(22) PCT Filed: Dec. 19, 2005

(86) PCT No.: PCT/JP2005/023277
§ 371 (c)(1),
(2), (4) Date: Nov. 2, 2007

(87) PCT Pub. No.: WO2006/070634
PCT Pub. Date: Jul. 6, 2006

(65) Prior Publication Data
US 2008/0177017 A1    Jul. 24, 2008

(30) Foreign Application Priority Data
Dec. 28, 2004   (JP) .................... 2004-380145

(51) Int. Cl.
C08C 19/22 (2006.01)
C08F 8/30 (2006.01)
C08K 3/04 (2006.01)
B60C 1/00 (2006.01)

(52) U.S. Cl. .............. 525/331.9; 525/332.9; 525/333.1; 525/333.2; 525/375; 524/572; 524/576; 152/564

(58) Field of Classification Search ............. 525/331.9, 525/332.9, 333.1, 333.2, 375; 524/572, 576
See application file for complete search history.

(56) References Cited

U.S. PATENT DOCUMENTS

| | | | |
|---|---|---|---|
| 4,880,857 A | 11/1989 | Mori et al. | |
| 5,332,784 A * | 7/1994 | Shiraki et al. | 525/98 |
| 5,576,376 A * | 11/1996 | Shibata et al. | 524/495 |
| 5,721,320 A | 2/1998 | Priddy et al. | |
| 5,736,617 A * | 4/1998 | Kerns et al. | 525/355 |
| 5,880,206 A * | 3/1999 | Nakamura et al. | 524/572 |
| 6,313,213 B1 * | 11/2001 | Nakamura et al. | 524/495 |
| 2003/0111770 A1* | 6/2003 | Bohm et al. | 264/349 |

FOREIGN PATENT DOCUMENTS

| | | | |
|---|---|---|---|
| JP | 62-246904 A | | 10/1987 |
| JP | 63-289043 A | | 11/1988 |
| JP | 7-238188 A | | 9/1995 |
| JP | 10-195114 A | | 7/1998 |
| JP | 11-189616 A | | 7/1999 |
| JP | 2001-508398 A | | 6/2001 |
| JP | 2004-331775 | * | 11/2004 |
| JP | 2004-331775 A | | 11/2004 |

OTHER PUBLICATIONS

M. Kobayashi, et al. "Synthesis of Well-Defined Polymers End-Functionalized with Crosslinkable Aziridine Groups by Living Anionic Polymerization", Journal of Polymer Science, Part A: Polymer Chemistry, vol. 43, No. 18, Sep. 15, 2005, pp. 4126-4135.

Entry for tris(2-methyl-1-aziridinyl)phosphine oxide in Japanese Chemical Substance Dictionary, see http://nikkajiweb.jst.go.jp/nikkaji_web/pages/top_e.html (date unknown).

* cited by examiner

*Primary Examiner* — Roberto Rabago
(74) *Attorney, Agent, or Firm* — Sughrue Mion, PLLC

(57) ABSTRACT

The present invention provides a modified polymer, which is obtained by reacting, with an active metal bonded to a polymer, a modifier represented by the general formula (I) (where $X^1$ to $X^5$ each represent a hydrogen atom or a specific monovalent functional group, and at least one of those is other than a hydrogen atom, $R^1$ to $R^5$ each represent a single bond or a divalent hydrocarbon group having 1 to 18 carbon atoms, and a plurality of aziridine rings may be bonded through any of $X^1$ to $X^5$ and $R^1$ to $R^5$). More particularly, the present invention provides a novel modified polymer which has excellent interaction with carbon black and enables improvement in dispersibility of the carbon black when used in a rubber composition blended with the carbon black, a rubber composition containing the modified polymer and capable of providing a tire excellent in low heat generating property, rupture characteristics, and abrasion resistance, and a tire made of the rubber composition and having the above-mentioned characteristics.

24 Claims, No Drawings

MODIFIED POLYMER, RUBBER COMPOSITION, AND TIRE

TECHNICAL FIELD

The present invention relates to a modified polymer, a rubber composition, and a tire. More particularly, the present invention relates to a novel modified polymer which has excellent interaction with carbon black and enables improvement in dispersibility of the carbon black when used in a rubber composition blended with the carbon black, a rubber composition containing the modified polymer and capable of providing a tire excellent in low heat generating property, rupture characteristics, and abrasion resistance, and a tire made of the rubber composition and having the above-mentioned characteristics.

BACKGROUND ART

In recent years, requirement for a reduction in fuel consumption of cars is intensifying in relation to a global movement toward regulation of carbon dioxide emission, which is led from social requirement for energy saving and an increasing interest in environmental issues. To meet such requirement, improvement of tire property, more particularly, a reduction in rolling resistance of a tire has been demanded. A method involving optimizing a tire structure has been studied as a method of reducing the rolling resistance of a tire, but a method which uses a material having low heat generation property as a rubber composition is employed as a most typical method.

To obtain such a rubber composition which generates less heat, a large number of techniques for enhancing the dispersibility of a filler used for a rubber composition has been developed. Among such techniques, particularly a method in which a polymerizable active end of a diene base polymer obtained by anion polymerization using an organic lithium compound is modified with a functional group having interaction with a filler is becoming the most popular method.

As such methods, there are disclosed a method in which carbon black is used for a filler to modify a polymerizable active end with a tin compound (see, for example, Patent Document 1) and a method in which carbon black is used in the same manner to introduce an amino group into a polymerizable active end (see, for example, Patent Document 2). Those methods are capable of increasing the dispersibility of carbon black. However, a further increase in dispersibility of carbon black is demanded.

On the other hand, a modified polymer which is obtained by introducing alkoxysilane having a dialkylamino group into an active end of a polymer obtained by anion polymerization using alkyllithium or lithium amide as a polymerization initiator, is disclosed (see, for example, Patent Documents 3 and 4). However, use of the above modified polymer, of which the amino group is substituted with a dialkyl group having less effect to carbon black, fails to provide sufficient effects particularly for blends that contain a large amount of carbon black, as compared with the case of using a modified polymer obtained by using a tin-based modifier.

Further, a modified polymer using aziridine (ethyleneimine or propyleneimine) as a modifier is known. In this case, aziridine is ring-opened by the modification reaction, so the modified polymer contains no aziridine structure.
Patent Document 1: JP 05-87530 B
Patent Document 2: JP 62-207342 A
Patent Document 3: JP 06-53763 B
Patent Document 4: JP 06-57767 B

DISCLOSURE OF THE INVENTION

Under the circumstances as described above, it is an object of the present invention to provide a novel modified polymer which has excellent interaction with carbon black and enables improvement in dispersibility of the carbon black when used in a rubber composition blended with the carbon black, a rubber composition containing the modified polymer and capable of providing a tire excellent in low heat generating property, rupture characteristics, and abrasion resistance, and a tire made of the rubber composition and having the above-mentioned characteristics.

The inventors of the present invention have made extensive studies to achieve the above-mentioned object, and as a result, they have found that a modified polymer obtained by using a modifier with a specified structure having an aziridine skeleton is superior in interaction with carbon black to a modified polymer obtained by using a tin-based modifier, and that the rubber composition containing such modified polymer can provide a tire excellent in low heat generation property, rupture property, and abrasion resistance. The present invention has been accomplished based on those findings.

That is, the present invention provides the following:

(1) A modified polymer obtained by reacting, with an active metal bonded to a polymer, a modifier represented by a general formula (I):

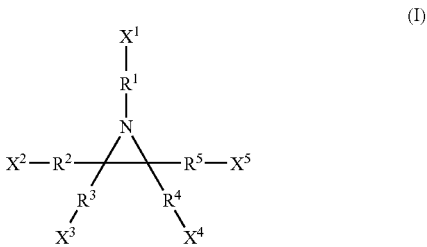

where $X^1$ to $X^5$ independently represent a hydrogen atom or a monovalent functional group containing at least one member selected from the group consisting of a halogen atom, a carbonyl group, a thiocarbonyl group, an isocyanate group, a thioisocyanate group, an epoxy group, a thioepoxy group, a halogenated silyl group, a hydrocarbyloxysilyl group, and a sulfonyloxy group and containing neither active proton nor onium salt, $X^1$ to $X^5$ may be the same or different from each other and at least one of them is other than a hydrogen atom, $R^1$ to $R^5$ independently represent a single bond or a divalent hydrocarbon group having 1 to 18 carbon atoms, and a plurality of aziridine rings may be optionally bonded through any of $X^1$ to $X^5$ and $R^1$ to $R^5$;

(2) The modified polymer according to the above-mentioned item (1), in which the modifier comprises one that does not simultaneously satisfy conditions of $X^1$=a hydrogen atom and $R^1$=a single bond in the general formula (I);

(3) The modified polymer according to the above-mentioned item (1) or (2), in which the active metal bonded to the polymer is at least one member selected from alkali metals, alkaline earth metals, transition metals, and organoaluminum;

(4) The modified polymer according to any one of the above-mentioned items (1) to (3), in which the polymer is a homopolymer of 1,3-butadiene or isoprene, or a copolymer of 1,3-butadiene or isoprene with an aromatic vinyl compound;

(5) The modified polymer according to the above-mentioned item (4), in which the aromatic vinyl compound is styrene;

(6) The modified polymer according to any one of the above-mentioned items (1) to (5), in which the modified polymer has a Mooney viscosity ($ML_{1+4}/100°$ C.) of 10 to 150 and a peak molecular weight of 50,000 to 500,000;

(7) A rubber composition including the modified polymer according to any one of the above-mentioned items (1) to (6) in a ratio of 10 mass % or more with respect to all rubber components;

(8) The rubber composition according to the above-mentioned item (7), in which the rubber composition contains 10 to 100 mass parts of carbon black or a combination of the carbon black with an inorganic filler per 100 mass parts of the rubber component;

(9) The rubber composition according to the above-mentioned item (7) or (8), in which the rubber composition is obtained by mixing zinc white and the carbon black in the same blending stage;

(10) The rubber composition according to any one of the above-mentioned items (7) to (9), in which the rubber composition is obtained by mixing an antioxidant in a blending stage after the mixing of the modified polymer and the zinc white;

(11) The rubber composition according to any one of the above-mentioned items (7) to (10), which is sulfur curable; and

(12) A tire including the rubber composition according to any one of the above-mentioned items (7) to (11).

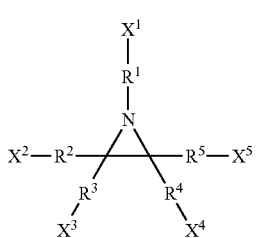

In the general formula (I) above, $X^1$ to $X^5$ independently represent a hydrogen atom or a monovalent functional group containing at least one selected from a halogen atom, a carbonyl group, a thiocarbonyl group, an isocyanate group, a thioisocyanate group, an epoxy group, a thioepoxy group, a halogenated silyl group, a hydrocarbyloxysilyl group, and a sulfonyloxy group and containing neither active proton nor onium salt. $X^1$ to $X^5$ may be the same or different from each other and at least one of them is other than a hydrogen atom.

$R^1$ to $R^5$ independently represent a single bond or a divalent hydrocarbon group having 1 to 18 carbon atoms. Examples of the divalent hydrocarbon group include alkylene groups having 1 to 18 carbon atoms, alkenylene groups having 2 to 18 carbon atoms, arylene groups having 6 to 18 carbon atoms, and aralkylene groups having 7 to 18 carbon atoms. Of those, alkylene groups having 1 to 18 carbon atoms, particularly alkylene groups having 1 to 10 carbon atoms are preferable. The alkylene groups may be linear, branched, or cyclic, with liner ones being particularly preferable. Examples of the linear alkylene groups include a methylene group, an ethylene group, a trimethylene group, a tetramethylene group, a pentamethylene group, a hexamethylene group, an octamethylene group, and a decamethylene group.

A plurality of aziridine rings may be bonded through any of $X^1$ to $X^5$ and $R^1$ to $R^5$.

The modifier is preferably one in which the conditions of $X^1$=a hydrogen atom and $R^1$=a single bond are not simultaneously met.

Examples of the modifier represented by the general formula (I) above include 1-acetylaziridine, 1-propionylaziridine, 1-butyrylaziridine, 1-isobutyrylaziridine, 1-valerylaziridine, 1-isovalerylaziridine, 1-pivaloylaziridine, 1-acetyl-2-methylaziridine, 2-methyl-1-propionylaziridine, 1-butyryl-2-methylaziridine, 2-methyl-1-isobutyrylaziridine, 2-methyl-1-valerylaziridine, 1-isovaleryl-2-methylaziridine, 2-methyl-1-pivaloylaziridine, ethyl 3-(1-aziridinyl)propionate, propyl 3-(1-aziridinyl)propionate, butyl 3-(1-azirldinyl)propionate, ethylene glycol bis[3-(1-aziridinyl)propionate], trimethylolpropane tris[3-(1-aziridinyl)propionate], ethyl 3-(2-methyl-1-aziridinyl)propionate, propyl 3-(2-methyl-1-aziridinyl)propionate, butyl 3-(2-methyl-1-aziridinyl)propionate, ethylene glycol bis[3-(2-methyl-1-aziridinyl)propionate], trimethylolpropane tris[3-(2-methyl-1-aziridinyl)propionate], neopentyl glycol bis[3-(1-aziridinyl)propionate], neopentyl glycol bis[3-(2-methyl-1-aziridinyl)propionate], di(1-aziridinylcarbonyl)methane, 1,2-di(1-aziridinylcarbonyl)ethane, 1,3-di(1-aziridinylcarbonyl)propane, 1,4-di(1-aziridinylcarbonyl)butane, 1,5-di(1-aziridinylcarbonyl)pentane, di(2-methyl-1-aziridinylcarbonyl)methane, 1,2-di(2-methyl-1-aziridinylcarbonyl)ethane, 1,3-di(2-methyl-1-aziridinylcarbonyl)propane, and 1,4-di(2-methyl-1-aziridinylcarbonyl)butane, but are not limited thereto.

In the present invention, the modified polymer is produced by reacting the modifier with the active metal bonded to the polymer. The active metal to be bonded to the polymer is preferably at least one member selected from an alkali metal, an alkaline earth metal, a transition metal, and organoaluminum.

The polymer to which such active metal is bonded can be obtained by anion polymerization or coordination polymerization of a diene compound alone or a diene compound and an aromatic vinyl compound. Note that the alkali metal or alkaline earth metal can be bonded to the polymer usually by the anion polymerization while the transition metal or organoaluminum can be bonded to the polymer usually by the coordination polymerization. The polymerization method is not particularly limited and any of a solution polymerization method, a gas-phase polymerization method, a bulk polymerization method may be used, with the solution polymerization method being particularly preferable. The type of the polymerization may be either batch-wise or continuous.

In the solution polymerization method using, for example, a lithium compound as a polymerization initiator, a diene compound alone or a diene compound and an aromatic vinyl compound can be anion-polymerized to produce a target polymer. It is only necessary for the active metal to be present in the molecule of the polymer, and, although not particularly limited, the active metal is generally bonded to an end of the polymer when the polymer is one produced by anion polymerization using an alkali metal compound and/or alkaline earth metal compound as a polymerization initiator.

The diene compound is preferably a conjugated diene compound, and examples thereof include 1,3-butadiene, isoprene, 1,3-pentadiene, 2,3-dimethylbutadiene, 2-phenyl-1,3-butadiene, and 1,3-hexadiene. Those may be used alone or two or more of them may be used in combination. Of those, 1,3-butadiene and isoprene are particularly preferable.

Further, examples of the aromatic vinyl compound used for copolymerization with the conjugated diene compounds include α-methylstyrene, 1-vinylnaphthalene, 3-vinyltoluene, ethylvinylbenzene, divinylbenzene, 4-cyclohexylstyrene, and 2,4,6-trimethylstyrene. Those may be used alone or two or more of them may be used in combination. Of those, styrene is particularly preferable.

Further, when copolymerization using a conjugated diene compound and an aromatic vinyl compound as a monomer is carried out, respective use of 1,3-butadiene and styrene is particularly preferable because of its practicality such as availability, and because anion polymerization property is excellent in terms of living property.

Further, when a solution polymerization method is used, the concentration of the monomer in the solution is preferably 5 to 50 mass %, more preferably 10 to 30 mass %. Note that when copolymerization is performed using a conjugated diene compound and an aromatic vinyl compound, the content of the aromatic vinyl compound in the charged monomer mixture is preferably 3 to 50 mass %, more preferably 5 to 45 mass %.

When adopting the anion polymerization, the polymerization initiator preferably is a lithium compound. Although the lithium compound as a polymerization initiator is not particularly limited, hydrocarbyl lithium and lithium amide compounds are preferably used. In the former case where the hydrocarbyl lithium is used, a conjugated diene polymer that has a hydrocarbyl group on the polymerization initiating end and a polymerization active site on the other end is obtained. On the other hand, in the latter case where a lithium amide compound is used, a conjugated diene polymer having a nitrogen-containing group on the polymerization initiating end and a polymerization active site on the other end is obtained.

For the hydrocarbyl lithium, a hydrocarbyl group having 2 to 20 carbon atoms is preferable, and examples thereof include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, and a reaction product between diisopropenylbenzene and butyl lithium. Of those, n-butyl lithium is preferable.

On the other hand, examples of lithium amide compounds include lithium hexamethyleneimide, lithium pyrrolidide, lithium piperidide, lithium heptamethyleneimide, lithium dodecamethylene imide, lithium dimethyl amide, lithium diethyl amide, lithium dibutyl amide, lithium dipropyl amide, lithium diheptyl amide, lithium dihexyl amide, lithium dioctyl amide, lithium di-2-ethylhexyl amide, lithium didecyl amide, lithium-N-methylpiperazide, lithium ethylpropyl amide, lithium ethylbutyl amide, lithium methylbutyl amide, lithium ethylbenzyl amide, and lithium methylphenethyl amide. Of those, from viewpoints of an interaction effect and a polymerization initiating function with respect to carbon black, cyclic lithium amide such as lithium hexamethylene imide, lithium pyrolizide, lithium piperidide, lithium heptamethylene imide, and lithium dodecamethylene imide, is preferable. Of those, lithium hexamethylene imide and lithium pyrolizide are the most preferable.

The lithium amide compound often used in the polymerization is generally prepared in advance from a secondary amine and a lithium compound. However, the lithium amide compound can be prepared in the polymerization system (in situ). Further, the use amount of the polymerization initiator is selected in the range of preferably 0.2 to 20 mmol per 100 g monomer.

The method of producing a conjugated diene polymer by anion polymerization using the lithium compound as a polymerization initiator is not particularly limited and a conventional method can be used.

Specifically, the target conjugated diene polymer can be obtained by reacting a conjugated diene compound or a conjugated diene compound and an aromatic vinyl compound by anion polymerization in an organic solvent inert to the reaction, for example, a hydrocarbon solvent such as an aliphatic, alicyclic, or aromatic hydrocarbon compound, using the lithium compound as a polymerization initiator in the presence of a randomizer if desired.

The hydrocarbon solvents are preferably those having 3 to 8 carbon atoms, and examples thereof include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. Those may be used alone or two or more of them may be used in combination.

Further, the randomizer that can be used if desired refers to a compound having an action to control the microstructure of the conjugated diene polymer, for example, an increase in 1,2-bond in the butadiene moiety in the butadiene-styrene copolymer or 3,4-bond in the isoprene polymer, or to control the composition distribution of monomer units in the conjugated diene compound-aromatic vinyl compound copolymer, for example, randomization of butadiene unit and styrene unit in the butadiene-styrene copolymer. The randomizer is not particularly limited and any compound appropriately selected from the known compounds generally used as randomizers can be used. Specific examples thereof include ethers and tertiary amines such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine, and 1,2-dipiperidinoethane. Further, potassium salts such as potassium t-amylate and potassium t-butoxide, and sodium salts such as sodium t-amylate can be used.

The randomizers may be used alone or two or more of them may be used in combination. The use amount thereof is selected in the range of preferably 0.01 to 1000 mole equivalents per mole of the lithium compound.

On the other hand, when a coordination polymerization is adopted, the polymerization catalyst is preferably one obtained by a combination of at least one compound selected from each of the components (A), (B), and (C) below. That is, Component (A)

A rare earth compound selected from (A1) to (A4) below may either be used as it is as an inert organic solvent solution or be carried on an inert solid before use.

(A1) A rare earth compound with an oxidation number of 3 having a total of three ordinates optionally selected from the group consisting of a carboxyl group having 2 to 30 carbon atoms, an alkoxy group having 2 to 30 carbon atoms, an aryloxy group having 6 to 30 carbon atoms, and an α,γ-diketonyl group having 5 to 30 carbon atoms, or a complex of such rare earth compound with a Lewis base compound (in particular, selected from a free carboxylic acid, a free alcohol, an α,γ-diketone, a cyclic ether, a linear ether, trihydrocarbyl phosphine, trihydrocarbyl phosphite, and so on). Specific examples of the rare earth compound include neodymium tri-2-ethylhexanoate, a complex of neodymium tri-2-ethylhexanoate with acetylacetone, neodymium tri-neodecanoate, a complex of neodymium tri-neodecanoate with acetylacetone, and neodymium tri-n-butoxide.

(A2) A complex of a trihalide of a rare earth element with a Lewis base. An example thereof is a THF complex of neodymium trichloride.
(A3) An organic rare earth compound with an oxidation number of 3 having at least one (substituted) aryl group bonded directly to the rare earth atom. An example thereof is a salt of tetraallyl neodymium and lithium.
(A4) An organic rare earth compound with an oxidation number of 2 or 3 having at least one (substituted) cyclopentadienyl group bonded directly to the rare earth atom, or a reaction product of this compound with an ionic compound consisting of a trialkylaluminum or a non-coordinating anion and a counter cation. An example thereof is dimethylaluminum (μ-dimethyl)bis(pentamethylcyclopentadienyl) samarium.

Preferable rare earth elements in the rare earth compounds include lanthanum, neodymium, praseodymium, samarium, and gadolinium, with lanthanum, neodymium, and samarium being more preferable.

Among the components (A), carboxylate of neodymium and substituted cyclopentadienyl compounds of samarium and gadolinium are preferable.

Component (B)

At least one organoaluminum compound selected from the following three. A plurality of organoaluminum compounds can be used simultaneously.
(B1) A trihydrocarbylaluminum compound represented by the formula $R^6{}_3Al$ (where $R^6$'s, which maybe the same or different from each other, each represent a hydrocarbon group having 1 to 30 carbon atoms).
(B2) A hydrocarbylaluminum hydride or dihydride compound represented by the formula $R^7{}_2AlH$ or $R^7AlH_2$ (where $R^7$'s, which may be the same or different from each other, each represent a hydrocarbon group having 1 to 30 carbon atoms).
(B3) A hydrocarbylaluminoxane compound having a hydrocarbon group having 1 to 30 carbon atoms.

Examples of the component (B) include trialkylaluminum, dialkylaluminum hydride, alkylaluminum dihydride, and alkylaluminoxane. Those compounds may be used as mixtures. Of the components (B), a combined use of aluminoxane and other organoaluminum compound is preferable.

Component (C)

A compound selected from the following four compounds. However, when the component (A) includes a halogen or a non-coordinating anion, and the component (B) includes aluminoxane, this compound is not always necessary.
(C1) An inorganic or organic II, III, or IV group compound containing a hydrolyzable halogen or a complex thereof with a Lewis base. Examples of such compound include alkylaluminum dichlorides, dialkylaluminum chlorides, silicon tetrachloride, tin tetrachloride, a complex of zinc chloride with a Lewis base such as alcohol, and a complex of magnesium chloride with a Lewis base such as alcohol.
(C2) At least one organic halide compound having a structure selected from tertiary alkyl halide, benzyl halide, and aryl halide. Examples thereof include benzyl chloride, t-butyl chloride, benzyl bromide, and t-butyl bromide.
(C3) A zinc halide or a complex thereof with a Lewis base.
(C4) An ionic compound consisting of a non-coordinating anion and a counter cation. Examples of the ionic compound that can be preferably used include triphenylcarbonium tetrakis(pentafluorophenyl)borate.

The above-mentioned catalyst may be prepared by using the same conjugated diene as the monomer for polymerization and/or non-conjugated diene monomer auxiliary if necessary in addition to the components (A), (B), and (C) above.

Further, a part or the whole of the component (A) or (C) may be carried on an inert solid before use. In this case, so-called gas-phase polymerization can be used.

The use amount of the above-mentioned catalyst may be set as appropriate. Usually, the component (A) is used in an amount of 0.001 to 0.5 mmol per 100 g of monomer. Further, the ratio of component (B)/component (A) is 5 to 100 by mole, and the ratio of component (C)/component (A) is 0.5 to 10 by mole.

The solvents to be used in the case of solution polymerization include organic solvents that are inert to the reaction, for example, hydrocarbon solvents such as aliphatic, alicyclic, and aromatic hydrocarbon compounds. Specifically, organic solvents having 3 to 8 carbon atoms are preferable, examples of which include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. Those may be used alone or two or more of them may be used in combination.

The temperature of the anion polymerization reaction is selected in the range of preferably 0 to 150° C., more preferably 20 to 130° C. On the other hand, the temperature of coordination polymerization reaction is selected in the range of preferably −80 to 150° C., more preferably −20 to 120° C. The polymerization reaction can be performed under developed pressure. Generally, the reaction is preferably operated under a pressure sufficient for keeping the monomer substantially in a liquid phase. That is, although the pressure depends on individual substances to be polymerized, polymerization catalyst used, and polymerization temperature, a higher pressure can be used if desired. Such a pressure can be obtained by an appropriate method such as pressurizing the reactor with a gas inert to the polymerization reaction.

In those polymerization reactions, all the raw materials that participate in the polymerization, such as a polymerization initiator, a solvent, and a monomer are preferably those from which reaction inhibiting substances such as water, oxygen, carbon dioxide, and protic compounds have been removed.

Note that in the case where the polymer to be obtained is an elastomer, the obtained polymer or copolymer preferably has a glass transition temperature (Tg) obtained by a differential thermal analysis method of −110° C. to −15° C. It is difficult to obtain a polymer having a glass transition temperature of below −110° C. When the polymer has a glass transition temperature of above −15° C., a viscosity of the obtained polymer may become too high in a room temperature region, whereby it becomes difficult to handle the polymer.

In the present invention, the modifier represented by the general formula (I) is added to the thus obtained polymer having an active metal bonded thereto preferably in an amount stoichiometric to the active metal of the polymer or in excess thereof so as to allow the modifier to react with the active metal bonded to the polymer.

In the present invention, after the modification reaction, a known antioxidant or an alcohol for terminating the polymerization reaction is added if desired.

After performing modification treatment in this manner, a conventional known post-treatment such as desolvation is performed to obtain a modified polymer of a target. The analysis of the polymer chain active site modifying group of the modified polymer can be performed by using high performance liquid chromatography (HPLC) or nuclear magnetic resonance spectrometry (NMR).

Further, the modified polymer has a Mooney viscosity ($ML_{1+4}$, 100° C.) of preferably 10 to 150, more preferably 15 to 100. If the modified polymer has a Mooney viscosity of less than 10, the polymer has insufficient rubber physical properties including rupture characteristics. If the modified polymer has a Mooney viscosity of more than 150, the modified polymer has an unsatisfactory workability, so it is difficult to knead the modified polymer together with compounding ingredients.

Further, the peak molecular weight of the modified polymer is in the range of preferably 50,000 to 500,000, particularly preferably 100,000 to 300,000 from the viewpoint of rubber physical property and workability. Note that the peak molecular weight is a value measured by a gel permeation chromatography method (GPC method) and expressed as polystyrene.

In the rubber composition of the present invention, the modified polymer must be contained in a ratio of 10 mass % or more with respect to all rubber components. If the content of the modified polymer with respect to all rubber components is 10 mass % or more, the modified polymer exhibits good interaction with carbon black. The content of the modified polymer with respect to all rubber components is preferably 30 to 100 mass %, more preferably 40 to 100 mass %.

The modified polymers may be used alone or two or more of them may be used in combination. The rubber component used in combination with the modified polymer includes natural rubber and diene-based synthetic rubber. Examples of the diene-based synthetic rubber include styrene-butadiene copolymer (SBR), polybutadiene (BR), polyisoprene (IR), butyl rubber (IIR), ethylene-propylene copolymer, and mixtures of those. Rubbers partially having a branched structure by use of a polyfunctional modifier, for example, tin tetrachloride may be used.

The rubber composition of the present invention may further contain carbon black or a combination of carbon black and an inorganic filler as a reinforcing filler. The carbon black is not particularly limited and any one of those conventionally used as a reinforcing filler for rubber may be selected. Examples of such carbon black include FEF, SRF, HAF, ISAF, and SAF. Carbon black having an iodine absorption (IA) of 60 mg/g or more and a dibutyl phthalate absorption (DBP) of 80 ml/100 g or more is preferable. By using such carbon black, improving effect of various physical properties becomes large. It is particularly preferable to use HAF, ISAF, and SAF, which are excellent in abrasion resistance.

On the other hand, silica and/or a compound represented by the general formula (II)

$$mM^1 \cdot xSiOy \cdot zH_2O \qquad (II)$$

can be used as the inorganic filler.

In the general formula (II) above, $M^1$ represents at least one member selected from a metal selected from aluminum, magnesium, titanium, calcium, and zirconium, oxides or hydroxides of the metals, and hydrates thereof, or carbonates of the metals, m, x, y, and z are integers of 1 to 5, 0 to 10, 2 to 5, and 0 to 10, respectively. Note that in the above formula, when x and z are both 0, the inorganic compound is at least one metal, metal oxide, or metal hydroxide, with the metal being selected from aluminum, magnesium, titanium, calcium, and zirconium.

The inorganic fillers represented by the general formula (II) above that can be used include alumina ($Al_2O_3$) such as γ-alumina or α-alumina, alumina hydrate ($Al_2O_3 \cdot H_2O$) such as boehmite or diaspore, aluminum hydroxide [$Al(OH)_3$] such as gibbsite or bayerite, aluminum carbonates [$Al_2(CO_3)_2$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$, etc.), magnesium silicate ($Mg_2SiO_4$, $MgSiO_3$, etc.), calcium silicate ($Ca_2 \cdot SiO_4$, etc.), aluminum calcium silicate ($Al_2O_3 \cdot CaO \cdot 2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$], and crystalline aluminosilicates containing hydrogen, alkali metal, or alkaline earth metal that compensates for charge, such as various types of zeolite. Further, $M^1$ in the general formula (II) preferably represents at least one member selected from an aluminum metal, an oxide or hydroxide of aluminum, and hydrates thereof, or carbonate of aluminum.

The inorganic compounds represented by the general formula (II) may be used alone or two or more of them may be used in combination. Further, the compounds may be used as mixtures with silica.

In the present invention, the most preferable inorganic filler is silica. The silica is not particularly limited and any one selected from those conventionally used as a reinforcing filler for rubber may be optionally used.

Examples of the silica include wet silica (hydrous silicic, dry silica (silicic anhydride), calcium silicate, and aluminum silicate. Of those, wet silica, which has a significant effect of providing both the effect of improving rupture characteristics and wet grip performance, is preferable.

In the present invention, when carbon black and an inorganic filler are used in combination, the ratio of the use amount of carbon black to that of the inorganic filler is preferably 95:5 to 5:95 by mass in view of the performance.

Further, the blending amount of the reinforcing filler is preferably 10 to 100 mass parts with respect to 100 mass parts of the rubber component. When the blending amount of the reinforcing filler is 10 mass parts or more with respect to the rubber component, the effect of improving the reinforcing property and other physical properties can be sufficiently exhibited. On the other hand, when the blending amount of the reinforcing filler is 100 mass parts or less, the processability is good. Taking the reinforcing property, other physical properties, and processability into consideration, the blending amount of the reinforcing filler in the range of 20 to 80 mass parts is particularly preferable.

When silica is used as a reinforcing filler, the rubber composition of the present invention can contain a silane coupling agent in order to further increase the reinforcing property of silica. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercantopropyldimethoxymethylsilane, dimethoxymethylsilylpropyl-N,N-dimethylthiocarbamoyl tetrasulfide, and dimethoxymethylsilyipropylbenzothiazole tetrasulfide. Of those, bis(3-triethoxysilylpropyl)tetrasulfide and 3-trimethoxysilylpropylbenzothiazolyl tetrasulfide are preferable from the viewpoint of the effect of improving the reinforcing property. Those silane coupling agents maybe used alone or two or more of them may be used in combination.

In the rubber composition of the present invention, a preferable blending amount of the silane coupling agent differs based on the type of the coupling agent, but is preferably selected in the range of 1 to 20 mass % with respect to silica. If this amount is in the above-mentioned range, the effect of the coupling agent is sufficiently exhibited and gelling of the rubber component hardly occurs. From the viewpoint of the effect of the coupling agent and prevention of gelling, the preferable amount of the silane coupling agent is in the range of 5 to 15 mass %.

The rubber composition of the present invention can contain various chemicals usually used in rubber industry, for example, vulcanizing agents, vulcanization promoters, processing oils, antioxidants, antiscorching agents, zinc white, and stearic acid, if desired as far as the object of the present invention can be achieved.

The rubber composition of the present invention is usually crosslinkable with sulfur, and sulfur is preferably used as a vulcanizing agent in a use amount of 0.1 to 10.0 mass parts, more preferably 1.0 to 5.0 mass parts as sulfur per 100 mass parts of the rubber component. If the sulfur content is 0.1 mass part or more, the vulcanized rubber has good rupture strength, abrasion resistance, and low heat generation property, while if the sulfur content is 10.0 mass parts or less, the rubber elasticity of the vulcanized rubber is good.

The vulcanization promoter that can be used in the present invention is not particularly limited, and examples thereof include thiazole compounds such as M (2-mercaptobenzothiazole), DN (dibenzothiazyl disulfide), and CZ (N-cyclohexyl-2-benzothiazyl sulfenamide), and guanidine compounds such as DPG (diphenylguanidine). A use amount thereof is preferably 0.1 to 5.0 mass parts, more preferably 0.2 to 3.0 mass parts per 100 mass parts of the rubber component.

Examples of the processing oil that can be used in the rubber composition of the present invention include paraffin-based, naphthene-based, and aromatic-based ones. The aromatic-based processing oil is used for applications where tensile strength and abrasion resistance are considered important, the naphthene- or paraffin-based processing oil is used for applications where hysteresis loss and low temperature properties are considered important. The use amount of the processing oil is preferably 0 to 100 mass parts per 100 mass parts of the rubber component. If the use amount of the processing oil is 100 mass parts or less, aggravation of the tensile strength and low heat generation property can be prevented.

Further, examples of the antioxidants that can be used in the rubber composition of the present invention include 3C(N-isopropyl-N'-phenyl-p-phenylenediamine), 6C [N-(1, 3-dimethylbutyl)-N'-phenyl-p-phenylenediamine], AW(6-ethoxy-2,2,4-trimethyl-1,2-dihydroquinoline), and high temperature condensates of diphenylamine and acetone. The use amount of the antioxidants is preferably 0.1 to 5.0 mass parts, more preferably 0.3 to 3.0 mass parts per 100 mass parts of the rubber component.

Examples of the method of preparing the rubber composition of the present invention include blending formulae (a), (b), and (c) indicated below.

In the blending formula (a), first, in a first blending stage, the rubber component containing the modified polymer, carbon black, or carbon black and an inorganic filler, and optionally a silane coupling agent, a process oil, stearic acid, and an antioxidant are mixed, and then, in a second blending stage, zinc white, a vulcanization promoter, and sulfur are further mixed.

In the blending formula (b), first, in a first blending stage, a rubber component containing a modified polymer, zinc white (1), carbon black, or carbon black and an inorganic filler, and optionally a silane coupling agent, a process oil, stearic acid, and an antioxidant are mixed, and then, in a second blending stage, zinc white (2), a vulcanization promoter, and sulfur are further mixed.

In the blending formula (c), first, in a first blending stage, a rubber component containing a modified polymer, zinc white (1), carbon black, or carbon black and an inorganic filler, and optionally a silane coupling agent, a process oil, and stearic acid are mixed, and then, in a second blending stage, an antioxidant, zinc white (2), a vulcanization promoter, and sulfur are mixed.

In the present invention, in the above-mentioned blending formulae, zinc white and carbon black are preferably mixed in the same blending stage, and hence, the blending formulae (b) and (c) are preferable. Further, the antioxidant is preferably mixed in a blending stage after the mixing of the modified polymer with zinc white, and hence, among the blending formulae (b) and (c), the blending formula (c) is more preferable.

A blending stage may be added between the first blending stage and the second blending stage if necessary.

The rubber composition of the present invention can be obtained by kneading the components by a kneading machine such as a roll or an internal mixer according to the blending formula, and after molding processing, vulcanization is performed, whereby the product can be used for applications for a tire such as tire tread, under tread, sidewall, carcass coating rubber, belt coating rubber, bead filler, chafer, and bead coating rubber as well as applications for vibration absorbing rubber, belt, hose, and other industrial products. In particular, the rubber composition of the present invention can be preferably used as a rubber for tire tread.

The tire of the present invention is produced by a conventional method using the rubber composition of the present invention. That is, the rubber composition of the present invention containing various chemicals as described above in an unvulcanized stage is processed into respective members and molded by a conventional building method on a tire building machine to produce a green tire. The green tire is heated under pressure in a vulcanizing machine to obtain a tire.

The tire of the present invention thus obtained has good low-fuel consumption property and simultaneously has excellent rupture characteristics and abrasion resistance, and in addition, processability of the rubber composition is good, resulting in excellent productivity.

EXAMPLE

Hereinafter, the present invention is described in more detail by way of examples. However, the present invention is not limited to those examples.

Note that the physical properties of the polymer were measured by the following methods.
<<Physical Property of Polymer>>

Measurement of peak molecular weight of a polymer was performed by gel permeation chromatography [GPC; HLC-8020 manufactured by TOSOH CORPORATION, column: GMH-XL manufactured by TOSOH CORPORATION (two columns in series)] and determined by using differential refractive index (RI) as polystyrene based on a monodisperse polystyrene as a standard.

The Mooney viscosity of the polymer was measured by using a RLM-01 Model tester manufactured by Toyo Seiki Seisaku-Sho, Ltd. at 100° C.

The low heat generation property of vulcanized rubber was measured by the following method and the Mooney viscosity of the rubber composition was measured as follows.

<<Low Heat Generation Property of Vulcanized Rubber>>

Using a viscoelasticity measuring apparatus (manufactured by Rheometrics Inc.), tan δ (50° C.) was measured at a temperature of 50° C., at a strain of 5%, and a frequency of 15 Hz. The smaller the tan δ (50° C.), the lower the heat generation property.

<<Mooney Viscosity of Rubber Composition>>

According to JIS K6300-1994, Mooney viscosity [$ML_{1+4}$/130° C.] was measured at 130° C.

The raw materials used for polymerization were those dried and purified unless otherwise stated.

Production Example 1

Polymer A

In a 800-ml pressure-resistant glass vessel dried and purged with nitrogen were charged a cyclohexane solution (16 mass %) of 1,3-butadiene and a cycloheaxne solution (21 mass %) of styrene such that 50 g of 1,3-butadiene and 15 g of styrene were present. To this were added 0.29 mmol of 2,2-ditetrahydrofurylpropane and then 0.57 mmol of n-butyllithium (BuLi). Then, the resultant mixture was allowed to polymerize at 50° C. for 1.5 hours. The conversion rate at this time was approximately 100%.

After that, 0.5 ml of 5 mass % isopropanol solution of 2,6-di-t-butyl-p-cresol (BHT) was added to the polymerization reaction system to terminate the polymerization reaction, and the product was dried according to a conventional method to obtain Polymer A. The analytical values of the obtained polymer are shown in Table 1.

Production Example 2

Polymer B

In a 800-ml pressure-resistant glass vessel dried and purged with nitrogen were charged a cyclohexane solution (16 mass %) of 1,3-butadiene and a cyclohexane solution (21 mass %) of styrene such that 50 g of 1,3-butadiene and 15 g of styrene were present. To this were added 0.36 mmol of 2,2-ditetrahydrofurylpropane and then 0.72 mmol of n-butyllithium (BuLi). Then, the resultant mixture was allowed to polymerize at 50° C. for 1.5 hours. The conversion rate at this time was approximately 100%.

Then, to the polymerization reaction system was added 0.18 mmol of tin tetrachloride (TTC) as a modifier, and further, modification reaction was performed at 500° C. for 30 minutes. After that, 0.5 ml of 5 mass % isopropanol solution of 2,6-di-t-butyl-p-cresol (BHT) was added to the polymerization reaction system to terminate the polymerization reaction, and the product was dried according to a conventional method to obtain Polymer B. The analytical values of the obtained polymer are shown in Table 1.

Production Example 3

Polymer C

Polymer C was obtained in the same manner as in Production Example 2 except that 0.72 mmol of 1-butyrylaziridine was used as a modifier instead of tin tetrachloride. The analytical values of the obtained polymer are shown in Table 1.

Production Example 4

Polymer D

Polymer D was obtained in the same manner as in Production Example 2 except that 0.72 mmol of 1-isobutyrylaziridine was used as a modifier instead of tin tetrachloride. The analytical values of the obtained polymer are shown in Table 1.

Production Example 5

Polymer E

Polymer E was obtained in the same manner as in Production Example 2 except that 0.24 mmol of trimethylolpropane tris[3-(2-methyl-1-aziridinyl)propionate] was used as a modifier instead of tin tetrachloride. The analytical values of the obtained polymer are shown in Table 1.

Production Example 6

Polymer F (1) Preparation of Catalyst Solution

In a 100-ml pressure-resistant glass vessel dried and purged with nitrogen were sequentially charged 7.11 g of a cyclohexane solution of butadiene (15.2 mass %), 0.59 ml of a cyclohexane solution of neodymium neodecanoate (concentration: 0.56 mol/l), 10.32 ml of a toluene solution of methylalurninoxane (MAO) ("PMAO" Manufactured by Tosoh Finechem Corporation) (aluminum concentration: 3.23 mol/l), and 7.77 ml of a hexane solution of diisobutylaluminum hydride (concentration: 0.90 mol/l) (manufactured by KANTO CHEMICAL CO., INC.) and allowed to mature at room temperature for 2 minutes. Then, 1.45 ml of a hexane solution of diethylaluminuin chloride (concentration: 0.95 mol/l) (manufactured by KANTO CHEMICAL CO., INC.) was added to the mixture and the resultant was allowed to mature at room temperature for 15 minutes with occasional stirring. The catalyst solution thus obtained had a neodymium concentration of 0.011 mol/l.

(2) Production of Polymer F

In a 800-ml pressure-resistant glass vessel dried and purged with nitrogen were charged a cyclohexane solution (16 mass %) of 1,3-butadiene such that 50 g of 1,3-butadiene was present. To this was added 3.90 ml of the catalyst solution prepared in the above-mentioned item (1) (0.043 mmol as neodymium), and the mixture was subjected to polymerization at 50° C. for 1.5 hours. The conversion rate at this time was approximately 100%.

After that, 0.5 ml of 5 mass % isopropanol solution of 2,6-di-t-butyl-p-cresol (BHT) was added to the polymerization reaction system to terminate the polymerization reaction, and further, the product was reprecipitated in an isopropanol solution containing a small amount of BHT. The precipitates were dried by a conventional method to obtain Polymer F. The analytical values of the obtained polymer are shown in Table 1.

Production Example 7

Polymer G

In a 800-ml pressure-resistant glass vessel dried and purged with nitrogen were charged a cyclohexane solution (16 mass %) of 1,3-butadiene such that 50 g of 1,3-butadiene was present. To this was added 1.32 ml of the catalyst solution prepared in Production Example 6 (1) (0.020 mmol as neodymium), and the mixture was subjected to polymerization at 50° C. for 1.5 hours. The conversion rate at this time was approximately 100%.

Then, 0.24 mmol of trimethylolpropane tris[3-(2-methyl-1-aziridinyl)propionate] was added as a modifier to the polymerization reaction system, and the resultant system was further subjected to modification reaction at 50° C. for 30 minutes. After that, 0.5 ml of 5 mass % isopropanol solution of 2,6-di-t-butyl-p-cresol (BHT) was added to the polymerization reaction system to terminate the polymerization reaction, and further, the product was reprecipitated in an isopropanol solution containing a small amount of BHT. The precipitates were dried by a conventional method to obtain a polymer. The analytical values of the obtained polymer are shown in Table 1.

TABLE 1

| | | Polymer | |
|---|---|---|---|
| | Type | Peak molecular weight (kg/mol) | Mooney viscosity [$ML_{1+4}$/100° C.] |
| Production Example | 1 A | 282 | 49 |
| | 2 B | 186 | 75 |
| | 3 C | 213 | 28 |
| | 4 D | 208 | 25 |
| | 5 E | 211 | 42 |
| | 6 F | 181 | 27 |
| | 7 G | 212 | 36 |

A to E: Anion polymerization
F, G: Coordination polymerization
A, F: Unmodified polymer
B: Tin-modified polymer
C, D, E, G: N-substituted aziridine-modified polymer

Examples 1 to 6 and Comparative Examples 1 to 5

Using Polymers A to G obtained in Production Examples 1 to 7, rubber compositions were prepared according to the blending formulae (a), (b), and (c) shown in Table 2, and Mooney viscosity of each rubber composition was measured. In addition, the polymers were vulcanized at 160° C. for 15 minutes and a physical property (low heat generation property) of the vulcanized rubbers was measured. The results obtained are shown in Table 3.

TABLE 2

| | Blending formula | |
|---|---|---|
| Kneading step | [Contents of blending] | (Mass parts) |
| First stage | Polymer | 100 |
| | Carbon black | 50 |
| | Aromatic oil | 10 |
| | Stearic acid | 2 |
| | Antioxidant 6C | 1 |
| Second stage | Zinc white | 3 |
| | Vulcanization promoter DPG | 0.5 |
| | Vulcanization promoter DM | 0.5 |
| | Vulcanization promoter NS | 0.5 |
| | Sulfur | 1.5 |
| First stage | Polymer | 100 |
| | Zinc white | 1 |
| | Carbon black | 50 |
| | Aromatic oil | 10 |
| | Stearic acid | 2 |
| | Antioxidant 6C | 1 |
| Second stage | Zinc white | 2 |
| | Vulcanization promoter DPG | 0.5 |
| | Vulcanization promoter DM | 0.5 |
| | Vulcanization promoter NS | 0.5 |
| | Sulfur | 1.5 |
| First stage | Polymer | 100 |
| | Zinc white | 1 |
| | Carbon black | 50 |
| | Aromatic oil | 10 |
| | Stearic acid | 2 |
| Second stage | Antioxidant 6C | 1 |
| | Zinc white | 2 |
| | Vulcanization promoter DPG | 0.5 |
| | Vulcanization promoter DM | 0.5 |
| | Vulcanization promoter NS | 0.5 |
| | Sulfur | 1.5 |

[Notes]
Carbon black; SEAST KH(N339) (trademark) manufactured by Tokai Carbon Co., Ltd.
Antioxidant 6C; N-(1,3-dimethylbutyl)-N'-phenyl-p-phenylene diamine
Vulcanization promoter DPG; diphenylguanidine
Vulcanization promoter DM; mercaptobenzothiazyl disulfide
Vulcanization promoter NS; N-t-butyl-2-benzothiazyl sulfenamide

TABLE 3

| | Rubber composition | | | |
|---|---|---|---|---|
| | Type of polymer | Blending formula | Mooney viscosity [$ML_{1+4}$/130° C.] | tanδ |
| Comparative Example 1 | A | a | 35 | 0.160 |
| Comparative Example 2 | B | a | 48 | 0.135 |
| Example 1 | C | a | 38 | 0.128 |
| Example 2 | D | a | 39 | 0.125 |
| Example 3 | E | a | 44 | 0.119 |
| Comparative Example 3 | B | b | 47 | 0.133 |
| Example 4 | E | b | 42 | 0.102 |
| Comparative Example 4 | B | c | 47 | 0.132 |
| Example 5 | E | c | 41 | 0.094 |
| Comparative Example 5 | F | c | 50 | 0.130 |
| Example 6 | G | c | 54 | 0.095 |

The following can be understood from Table 3.

The rubber compositions of the present invention (Examples 1 to 6) containing modified polymers obtained by using a modifier having an N-substituted aziridine structure is superior in low loss performance (low heat generation property) to the rubber compositions of Comparative Examples 1 and 5 that contain unmodified polymer and the rubber compositions of Comparative Examples 2, 3, and 4 that contain tin-modified polymer.

Further, in the rubber compositions of the present invention, low loss performance is enhanced due to simultaneous mixing of the modified polymer, zinc white, and carbon black in the same stage (by comparison between Examples 3 and 4).

Further, in the rubber compositions of the present invention, the low loss performance is further enhanced due to addition of the antioxidant in a stage after the blending of the modified polymer, zinc white, and carbon black (by comparison between Examples 4 and 5).

Note that Polymers A to E were obtained by anion polymerization while Polymers F and G were obtained by coordination polymerization.

INDUSTRIAL APPLICABILITY

The modified polymer of the present invention when used in rubber compositions blended with carbon black exhibits excellent interaction with the carbon black, so the dispersibility of the carbon black can be improved.

Further, the rubber composition containing the modified polymer can provide a tire having excellent low heat generating property, rupture characteristics, and abrasion resistance.

The invention claimed is:

1. A modified polymer obtained by reacting, with an active metal bonded to a polymer obtained by coordination polymerization, a modifier represented by a general formula (I):

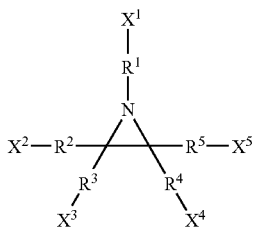

(I)

where $X^1$ to $X^5$ independently represent a hydrogen atom or a monovalent functional group containing at least one member selected from the group consisting of a halogen atom, a carbonyl group, a thiocarbonyl group, an isocyanate group, a thioisocyanate group, an epoxy group, a thioepoxy group, a halogenated silyl group, a hydrocarbyloxysilyl group, and a sulfonyloxy group and containing neither active proton nor onium salt, $X^1$ to $X^5$ may be the same or different from each other and at least one of them is other than a hydrogen atom, $R^1$ to $R^5$ independently represent a single bond or a divalent hydrocarbon group having 1 to 18 carbon atoms, and a plurality of aziridine rings may be optionally bonded through any of $X^1$ to $X^5$ and $R^1$ to $R^5$;

wherein the modified polymer has a peak molecular weight of 50,000 to 500,000, wherein the divalent hydrocarbon group having 1 to 18 carbon atoms of $R^1$ is selected from the group consisting of alkylene groups having 1 to 18 carbon atoms, alkenylene groups having 2 to 18 carbon atoms and aralkylene groups having 7 to 18 carbon atoms, and wherein the conditions of $X^1$=a hydrogen atom and $R^1$=a single bond are not simultaneously met.

2. The modified polymer according to claim 1, wherein the polymer comprises a homopolymer of 1,3-butadiene or isoprene, or a copolymer of 1,3-butadiene or isoprene with an aromatic vinyl compound.

3. The modified polymer according to claim 2, wherein the aromatic vinyl compound comprises styrene.

4. The modified polymer according to claim 1, wherein the modified polymer has a Mooney viscosity ($ML_{1+4}/100°$ C.) of 10 to 150.

5. A rubber composition, comprising the modified polymer according to claim 1 in a ratio of 10 mass % or more with respect to all rubber components.

6. The rubber composition according to claim 5, wherein the rubber composition contains 10 to 100 mass parts of carbon black or a combination of the carbon black with an inorganic filler per 100 mass parts of all rubber components.

7. The rubber composition according to claim 5, wherein the rubber composition is obtained by mixing zinc white and a carbon black in a same blending stage.

8. The rubber composition according to claim 5, wherein the rubber composition is obtained by mixing an antioxidant in a blending stage after the mixing of the modified polymer and a zinc white.

9. The rubber composition according to claim 5, which is sulfur curable.

10. A tire, comprising the rubber composition according to claim 5.

11. A modified polymer obtained by reacting, with an active metal bonded to a polymer obtained by coordination polymerization, a modifier represented by a general formula (I):

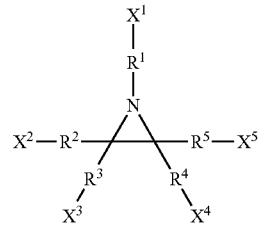

(I)

where $X^1$ to $X^5$ independently represent a hydrogen atom or a monovalent functional group containing at least one member selected from the group consisting of a halogen atom, a carbonyl group, a thiocarbonyl group, an isocyanate group, a thioisocyanate group, an epoxy group, a thioepoxy group, a halogenated silyl group, a hydrocarbyloxysilyl group, and a sulfonyloxy group and containing neither active proton nor onium salt, $X^1$ to $X^5$ may be the same or different from each other and at least one of them is other than a hydrogen atom, $R^1$ to $R^5$ independently represent a single bond or a divalent hydrocarbon group having 1 to 18 carbon atoms, and a plurality of aziridine rings may be optionally bonded through any of $X^1$ to $X^5$ and $R^1$ to $R^5$;

wherein the modified polymer has a Mooney viscosity ($ML_{1+4}/100°$ C.) of 10 to 150, wherein the divalent hydrocarbon group having 1 to 18 carbon atoms of $R^1$ is selected from the group consisting of alkylene groups having 1 to 18 carbon atoms, alkenylene groups having 2 to 18 carbon atoms and aralkylene groups having 7 to 18 carbon atoms, and wherein the conditions of $X^1$=a hydrogen atom and $R^1$=a single bond are not simultaneously met.

12. The modified polymer according to claim 11, wherein the polymer comprises a homopolymer of 1,3-butadiene or isoprene, or a copolymer of 1,3-butadiene or isoprene with an aromatic vinyl compound.

13. The modified polymer according to claim 12, wherein the aromatic vinyl compound comprises styrene.

14. A rubber composition, comprising the modified polymer according to claim 11 in a ratio of 10 mass % or more with respect to all rubber components.

15. The rubber composition according to claim 14, wherein the rubber composition contains 10 to 100 mass parts of carbon black or a combination of the carbon black with an inorganic filler per 100 mass parts of all rubber components.

16. The rubber composition according to claim 14, wherein the rubber composition is obtained by mixing zinc white and a carbon black in a same blending stage.

17. The rubber composition according to claim 14, wherein the rubber composition is obtained by mixing an antioxidant in a blending stage after the mixing of the modified polymer and a zinc white.

18. The rubber composition according to claim 14, which is sulfur curable.

19. A tire, comprising the rubber composition according to claim 14.

20. The rubber composition according to claim 5, wherein the modified polymer has a Mooney viscosity ($ML_{1+4}/100°$ C.) of 10 to 150.

21. The modified polymer according to claim 1, wherein the polymerization catalyst in the coordination polymerization is one obtained by a combination of at least one compound selected from component (A) and at least one compound selected from component (B), wherein the component (A) is a rare earth compound and the component (B) is an organoaluminum compound, and wherein the component (A) includes a halogen or a non-coordinating anion, and the component (B) includes aluminoxane.

22. The modified polymer according to claim 1, wherein the polymerization catalyst in the coordination polymerization is one obtained by a combination of at least one compound selected from component (A), at least one compound selected from component (B) and at least one compound selected from component (C), wherein the component (A) is a rare earth compound, the component (B) is an organoaluminum compound and the component (C) is a compound selected from (C1) an inorganic or organic II, III, or IV group compound containing a hydrolyzable halogen or a complex thereof with a Lewis base; (C2) at least one organic halide compound having a structure selected from tertiary alkyl halide, benzyl halide, and aryl halide; (C3) a zinc halide or a complex thereof with a Lewis base; (C4) an ionic compound consisting of a non-coordinating anion and a counter cation.

23. The modified polymer according to claim 11, wherein the polymerization catalyst in the coordination polymerization is one obtained by a combination of at least one compound selected from component (A) and at least one compound selected from component (B), wherein the component (A) is a rare earth compound and the component (B) is an organoaluminum compound, and wherein the component (A) includes a halogen or a non-coordinating anion, and the component (B) includes aluminoxane.

24. The modified polymer according to claim 11, wherein the polymerization catalyst in the coordination polymerization is one obtained by a combination of at least one compound selected from component (A), at least one compound selected from component (B), and at least one compound selected from component (C), wherein the component (A) is a rare earth compound, the component (B) is an organoaluminum compound and the component (C) is a compound selected from (C1) an inorganic or organic II, III, or IV group compound containing a hydrolyzable halogen or a complex thereof with a Lewis base; (C2) at least one organic halide compound having a structure selected from tertiary alkyl halide, benzyl halide, and aryl halide; (C3) a zinc halide or a complex thereof with a Lewis base; (C4) an ionic compound consisting of a non-coordinating anion and a counter cation.

\* \* \* \* \*